Oct. 11, 1966  J. A. SMYSER  3,278,157
SPRING COMPRESSOR FOR A SHOCK ABSORBER
Filed March 1, 1965
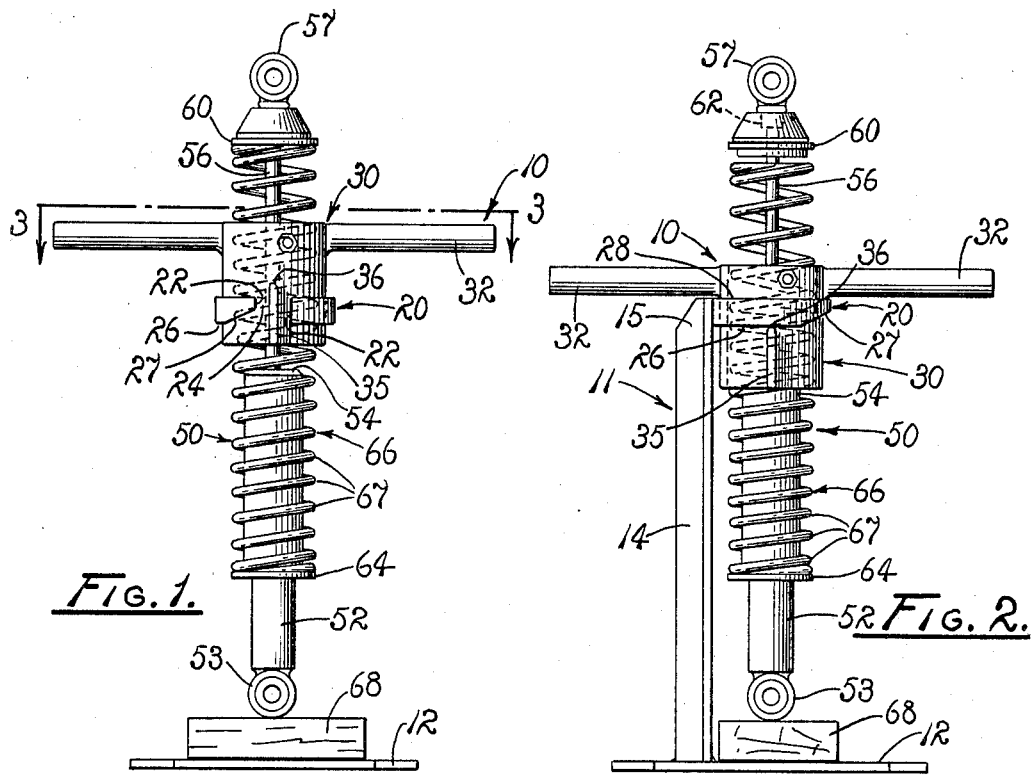
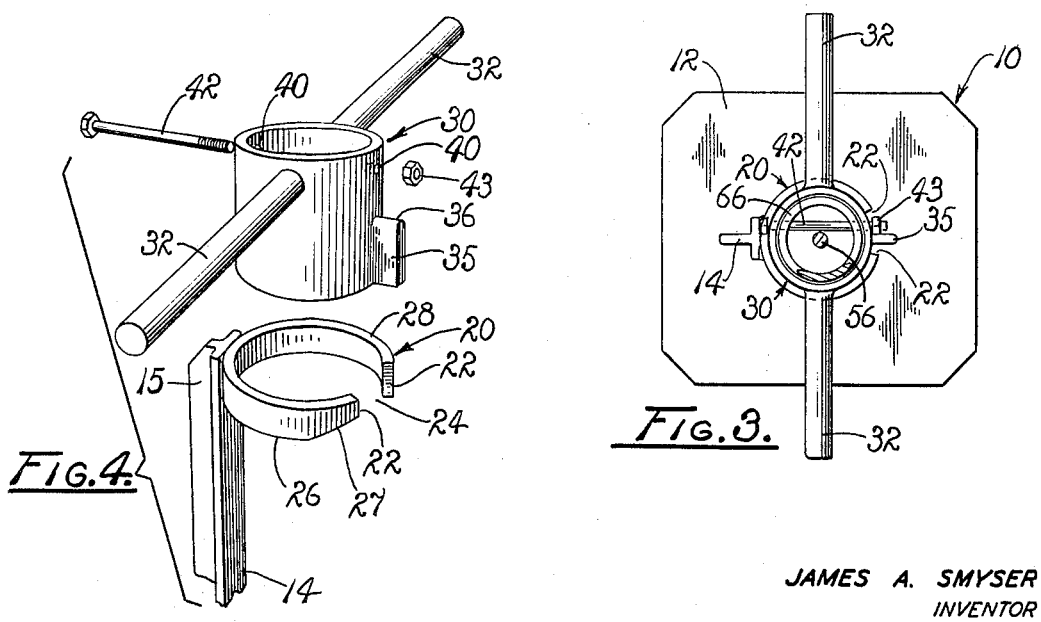
JAMES A. SMYSER
INVENTOR
Huebner & Worrel
ATTORNEYS

United States Patent Office

3,278,157
Patented Oct. 11, 1966

3,278,157
SPRING COMPRESSOR FOR A SHOCK ABSORBER
James A. Smyser, 5840 Pembroke Ave., Bakersfield, Calif.
Filed Mar. 1, 1965, Ser. No. 436,259
6 Claims. (Cl. 254—10.5)

The present invention relates to a spring compressor for a shock absorber having a removable spring keeper and more particularly to such a spring compressor which enables the spring force against the keeper to be quickly and conveniently relieved for unrestricted manipulation of the keeper when removing and replacing the spring.

Heavy-duty shock absorbers usually provide a pneumatic cylinder having an elongated coil spring disposed thereon in partially compressed condition between a pair of spaced keepers. One of the keepers is mounted on the cylinder and the other keeper is removably disposed on the rod end of the shock absorber for positioning the spring in partially compressed condition between the rod end and cylinder end of the shock absorber. The keeper on the rod end is removable so as to permit replacement of the spring. Such a shock absorber is usually employed between the axle and frame of a load carrying vehicle which frequently carries loads greater than the capacity of the shock absorber provided as original factory equipment. When the shock absorber spring is not sufficient to carry the anticipated load, it is replaced with a heavier spring having a greater resistance to being compressed. Spring replacement has in the past been difficult to accomplish without the employment of several workmen. The shock absorber must be held substantially stationary and the spring compressed sufficiently to free the removable keeper for unrestricted manipulation relative to the spring and the shock absorber. This has been an onerous task in that the spring is usually compressed by the use of conventional hand tools such as screwdrivers, pry bars, and the like which are inserted between selective adjacent coils of the spring to provide the necessary leverage for the workmen to compress the spring. Such tools are difficult to maintain in proper position with the spring and frequently slip out of engagement causing injury to the workmen. After removal of the keeper and the spring from the shock absorber, the procedure is reversed with replacement of the spring being even more onerous because of the increased force of the heavier replacement spring which must be manually held in a compressed condition during replacement of the keeper.

Accordingly, it is an object of the present invention to provide an improved spring compressor for a shock absorber.

Another object is to provide such an improved spring compressor which may be quickly and conveniently adapted to shock absorbers of various sizes.

Another object is to provide a spring compressor of the character described which is effective dependably to hold the spring in a compressed condition for unrestricted removal of the spring keeper from the shock absorber.

Another object is to provide a spring compressor for a shock absorber which is capable of maintaining the spring in such compressed condition during removal of the keeper without further manipulation by the operator.

Another object is to provide a spring compressor which is easily manipulated to permit controlled extension and removal of the spring from the shock absorber.

Other objects and advantages of the present invention will subsequently become more clearly apparent upon reference to the following description in the specification.

In the drawing:

FIG. 1 is a front elevation of a spring compressor embodying the principles of the present invention shown mounting a shock absorber with the spring thereof disposed in an extended condition.

FIG. 2 is a side elevation of the spring compressor of the present invention disposed in a locked position maintaining the shock absorber spring in a compressed condition.

FIG. 3 is a top plan of the spring compressor shown in the unlocked position of FIG. 1.

FIG. 4 is a somewhat enlarged fragmentary exploded perspective of the spring compressor with the shock absorber of the preceding figures removed therefrom.

Referring more particularly to the drawing, a spring compressor embodying the principles of the present invention is generally indicated by the reference numeral 10. The spring compressor provides a rigid stand 11 having a substantially square base 12 of substantially flat metallic sheet material 12 such as mill plate or the like. An elongated support post 14 is mounted on the base in a substantially upright position, as by welding or the like, in offset relation to the center of the base. The post is preferably T-shaped in cross section and terminates in an upper end 15.

A combined guide and lock ring 20 is rigidly secured, as by welding or the like to the upper end 15 of the post 14 in a plane disposed in spaced parallel relation to the base and in concentric circumscribing relation to an imaginary line extended upwardly from the center of the base. The guide and lock ring provides spaced outer ends 22 which define therebetween a slot 24. The ring includes a lower locking edge 26 having an angulated camming ramp 27 adjacent to one of the ends 22 and an opposite upper edge 28.

An elongated tubular control sleeve 30 is slidably disposed within the guide and lock ring 20. A pair of elongated rod-like handles 32 are extended radially outwardly from the sleeve in diametrically opposed relation and are adapted to rest upon the upper edge 28 of the ring when the spring compressor is not in use. The sleeve includes a latch element or dog 35 having an upper edge 36 which is radially outwardly extended from the sleeve in a plane substantially transversely related to the plane of the handles 32 for alignment with the slot 24 in the ring. A pair of aligned circular openings 40 are formed through the sleeve in a somewhat off-set parallel plane from the plane of the latch element 35. An elongated fastener member or locking bolt 42 is adapted to be extended through the openings 40 in the sleeve and is held in such position by a lock nut 43.

As best shown in FIGS. 1 and 2, conventional shock absorber indicated generally by the reference numeral 50 is adapted to be associated with the spring compressor 10 of the present invention. The shock absorber provides an elongated cylinder 52 having a bearing end 53 and an opposite head end 54. An elongated piston rod 56 is extended from the cylinder and provides a bearing end 57 opposite to the bearing end 53 of the cylinder. A spring keeper 60 is removably mounted on the piston rod adjacent to the bearing end 57 by a screw-threaded connector member 62. A non-removable spring keeper 64 is mounted on the cylinder 52 of the shock absorber in closely spaced relation to its bearing end 53. An elongated compression spring 66 providing a plurality of continuous coils 67 is disposed in circumscribing relation about the shock absorber in partially compressed relation between the keepers 60 and 64, as shown in FIG. 1. A substantially rectangular block 68 of wood or other somewhat compressible material is adapted to be disposed on the base 12 of the stand 11 to receive and to cushion the bearing end 53 of the shock absorber 50.

*Operation*

The operation of the described embodiment of the subject invention is believed to be clearly apparent and is briefly summarized at this point. When not in use, the control sleeve 30 is supported within the guide and lock ring 20 by the handles 32 resting upon the upper edge 28 of the ring. The latch element 35 is aligned with the slot 24 in the ring so that the sleeve may be axially slidably positioned relative to the ring. When it is desired to replace the spring 66 of the shock absorber 50, the lock bolt 42 is removed from the sleeve to permit unrestricted passage of the shock absorber and spring assembly therethrough with the bearing end 53 of the shock absorber rested on the block 68 on the base 12. The post 14, the guide and lock ring 20, and the sleeve 30 thereby constrain the shock absorber and spring assembly in the substantially upright position on the stand 11, as shown in FIG. 1.

The control sleeve 30 is then slid upwardly relative to the guide and lock ring 20 and the shock absorber and spring assembly to the position shown in FIG. 1 with the openings 40 in the sleeve aligned with a space between a pair of selected coils 67 of the spring 66. The lock bolt 42 is extended through the openings and between the selected coils in the spring and the lock nut 43 assembled thereon dependably to hold the sleeve in such elevated position on the spring. A downward manual force is imposed upon the handles 32 which, through the sleeve and the locking bolt 42, compresses the coils 67 of the spring 66 below the lock bolt to carry the upwardly disposed coils away from the spring keeper 64. During such downward movement of the handles to compress the spring, the latch element 35 moves through the slot 24 in the guide and lock ring 20. This movement continues until the upper edge 36 of the latch element is disposed in a position adjacent to the camming ramp 27 whereupon the handles 32 are rotated in a clockwise direction as viewed in FIG. 3. This rotary movement causes the latch element to slide along the ramp further to lower the sleeve and to compress the spring. It is noted that the described downward rotational camming movement of the latch element and sleeve is enhanced by the lock bolt 42 sliding relative to the downwardly inclined coils 67 of the spring.

Upon further rotational movement of the handles 32 and the control sleeve 30, the latch element 35 engages the lower locking edge 26 of the guide and lock ring 20, as shown in FIG. 2. With the control sleeve disposed in the locking position of FIG. 2, the upper coils 67 of the spring 66 are fully retracted from the spring keeper 60. The spring keeper is thereby completely free of any resistance to movement incident to spring pressure. Such movement is virtually impossible when the force of the spring is applied thereagainst. The bearing end 57 of the shock absorber 50 is then easily removed from the piston rod 56 by manipulation of the connector 62 to free the spring keeper 60 from the piston rod.

The spring 66 is then easily removed from the shock absorber 50 by rotation of the handles 32 in a counterclockwise direction, as viewed in FIG. 3, from the locking position of FIG. 2 to move the latch element 35 into the slot 24 of the guide and lock ring 20. As soon as the latch element is released from the cam ramp 27 into the slot, the force of the spring is released automatically to return the sleeve upwardly through the ring to a position somewhat upwardly disposed from the position of FIG. 1 depending upon the compression of the spring when disposed between the keepers 60 and 64. The release of the spring is readily controlled so as not to be too violent by a slight downward pressure on the handles of the sleeve. The spring is then completely removable from the shock absorber by lifting the handles 50 to remove the sleeve and spring assembly from the stand 11. The lock nut 43 is then removed to permit withdrawal of the lock bolt 42 from the sleeve and removal of the spring from the sleeve.

The spring 66 may then be replaced with any desired heavier spring. As before, the lock bolt 42 is extended through the openings 40 in the sleeve between selected adjacent coils of the new spring prior to placement on the stand 11. The spring and sleeve assembly is then disposed on the stand with the spring rested upon the keeper 64 and the sleeve disposed within the guide and lock ring 20. The positioning of the spring within the sleeve prior to such placement on the stand is not critical since the spring may be easily axially manipulated relative to the sleeve by manual rotation with the coils serving as screw threads in sliding engagement with the lock bolt 42. Accordingly, the upper coils of the spring may be subsequently lowered or actuated toward the sleeve in order to provide ample space for the unrestricted replacement of the spring keeper 60 after the spring is compressed. After adjustment, the sleeve is again returned to the locking position of FIG. 2 by rotation of the handles 32 in the above described manner. After reassembly of the spring keeper 60, the handles 32 are again manually motivated to rotate the sleeve and latch element back to the position of FIG. 1 to release the spring against the keepers. The lock bolt is then withdrawn from the sleeve to permit removal of the shock absorber and spring assembly from the stand.

In view of the foregoing, it is readily apparent that the present invention provides an improved spring remover for sock absorbers which may be quickly and conveniently connected to the spring which permits the spring to be easily compressed with a minimum of operator effort. Furthermore, the spring compressor of the present invention dependably maintains the spring in a compressed condition which frees the operator for the other operations necessary to the ultimate removal of the spring from the shock absorber or for other servicing. It is further significant that the spring compressor of the present invention is readily adapted to replacing springs of varying compression rates by permitting axial adjustment of the spring on the stand during assembly on the shock absorber.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A spring compressor, for a shock absorber having an elongated coil spring disposed thereon between a pair of spaced keepers, comprising a support stand, guide means borne by the stand loosely to receive therein and to constrain such a shock absorber and spring assembly in predetermined position on the stand, and a control member disposable in circumscribing relation to said assembly and being releasably connectable to the spring in spaced axially aligned concentric relation to said guide means for axial movement of the control member toward and into said guide means incident to the application of a force on the control member in a direction to compress the spring away from one of said keepers.

2. A spring compressor, for a shock absorber having an elongated coil spring disposed therein between a pair of spaced keepers, comprising a support stand, guide means borne by the stand loosely to receive therein and to constrain such a shock absorber and spring assembly on the stand, a control member disposable in circumscribing relation to said assembly and being slidable within said guide means, and fastener means removably borne by said control member and being connectable to the spring for disposing the control member in spaced axially aligned concentric relation to said guide means for movement of the control member toward and into said guide means incident to the application of a force on the control member in a direction to compress the spring away from one of said keepers.

3. A spring compressor, for a shock absorber having an elongated coil spring disposed thereon between a pair of spaced keepers, comprising a support stand, guide means borne by the stand adapted to constrain such a shock absorber and spring assembly on the stand, a control member slidable within said guide means providing a latching element, and fastener means releasably mounted on said control member being connectable to the spring in spaced relation to the guide means for movement of the control member toward said guide means incident to the application of a force on the control member in a direction to compress the spring away from one of said keepers with said latching element of the control member engaging the guide means releasably to hold said control member against return movement to permit unrestricted removal of said one of said keepers from the shock absorber.

4. A spring compressor, for a shock absorber having an elongated coil spring disposed thereon between a pair of spaced keepers, comprising a support stand, a guide ring borne by the stand adapted to constrain such a shock absorber and spring assembly in predetermined position on the stand, a control sleeve slidable in said guide ring in circumscribing relation to the shock absorber and spring assembly having handles outwardly extended therefrom and a latching element, and a fastener bolt extendable through said control sleeve between adjacent coils of the spring to move the spring away from one of said keepers incident to the application of a force on said handles of the sleeve to compress the spring with said latching element engaging said guide ring to hold the control sleeve and spring against return movement to permit unrestricted removal of said one of said keepers from the shock absorber.

5. A spring compressor, for a shock absorber having an elongated coil spring disposed thereon between a pair of spaced keepers, comprising a support stand, a guide ring borne by the stand having spaced ends defining a slot therebetween and being adapted to constrain such a shock absorber and spring assembly in predetermined position on the stand, a control sleeve slidable in said guide ring in circumscribing relation to the shock absorber and spring assembly having handles outwardly extended therefrom and a latch element, and a fastener bolt extendable through said control sleeve between selected adjacent coils of the spring with said latch element of the control sleeve aligned with said slot in the guide ring so that said spring is compressible away from one of said keepers incident to the application of a force on said handles of the sleeve to position said latch element beneath the guide ring in locking relation thereto incident to rotation of the handles to hold the control sleeve and spring against return movement to permit unrestricted removal of said one of said keepers from the shock absorber.

6. A spring compressor, for an automobile shock absorber having opposite cylinder and rod ends and an elongated coil spring disposed thereon between a pair of spaced keepers individually disposed adjacent to said cylinder and rod ends comprising a support stand having a base and a substantially upright post extended upwardly from the base and terminating in an upper end; a combined guide and lock ring mounted on the upper end of the post having circumferentially spaced outer ends defining a slot therebetween with the guide and lock ring being adapted to constrain such a shock absorber and spring assembly in a substantially upright position on the stand with said cylinder end rested upon the base of the stand and said rod end extended upwardly through said guide and lock ring, said guide and lock ring including a lower locking edge having a cam portion adjacent to one of said outer ends thereof; a control sleeve slidably disposed within said guide and lock ring in circumscribing relation to said shock absorber and spring assembly providing elongated handles outwardly extended therefrom and an integral latch member aligned with said slot in the guide and lock ring; and a fastener bolt extendable through said control sleeve between selected adjacent coils of the spring so that said spring is compressible away from said keeper at said rod end of the shock absorber incident to the application of a force on said handles of the sleeve to position said latch member beneath said guide and lock ring in sliding locking engagement with said cam portion and lower locking edge of the guide and lock ring incident to rotation of the handles to hold the control sleeve and spring against return movement to permit unrestricted removal of said keeper adjacent to said rod end of the shock absorber and subsequent removal of the spring from the shock absorber.

References Cited by the Examiner

UNITED STATES PATENTS

| 1,384,472 | 7/1921 | Leahy | 29—215 |
| 1,428,566 | 9/1922 | Timmerman. | |
| 1,449,551 | 3/1923 | Rock. | |
| 1,695,610 | 12/1928 | Ritter | 29—219 |
| 3,178,808 | 4/1965 | Pendley | 29—227 |

FOREIGN PATENTS

| 4,997 | 1911 | Great Britain. |

WILLIAM FELDMAN, *Primary Examiner.*

MILTON S. MEHR, *Examiner.*